United States Patent [19]

Roberts

[11] E Re. 31,067

[45] Reissued Oct. 26, 1982

[54] HYDROSTATIC CONTROL UNIT

[75] Inventor: Maurice P. Roberts, Otterbein, Ind.

[73] Assignee: TRW Inc., Cleveland, Ohio

[21] Appl. No.: 817,177

[22] Filed: Jul. 20, 1977

Related U.S. Patent Documents

Reissue of:

[64] Patent No.: 3,895,888
Issued: Jul. 22, 1975
Appl. No.: 407,776
Filed: Oct. 19, 1973

[51] Int. Cl.[3] ..... F01C 1/10; F04C 2/10; B62D 5/08

[52] U.S. Cl. ..... 418/61 B; 60/384; 180/163

[58] Field of Search ..... 418/61 B; 91/375 R, 91/391 R, 467; 60/384, 386; 137/614.11; 180/163

[56] References Cited

U.S. PATENT DOCUMENTS

| | | | |
|---|---|---|---|
| Re. 25,126 | 2/1962 | Charlson | 91/467 |
| 2,349,641 | 5/1944 | Tucker et al. | 91/375 |
| 3,289,542 | 12/1966 | Fikse | 418/61 B |
| 3,320,745 | 5/1967 | Bahniuk et al. | 60/384 |
| 3,348,493 | 10/1967 | Easton | 418/61 B |
| 3,360,932 | 1/1968 | Lech et al. | 60/386 |
| 3,431,863 | 3/1969 | Waldorff | 418/61 B |
| 3,443,378 | 5/1969 | Monroe et al. | 418/61 B |
| 3,446,021 | 5/1969 | Lech | 418/61 B |
| 3,452,543 | 7/1969 | Goff et al. | 60/384 |
| 3,470,758 | 10/1969 | Liebert | 91/375 |
| 3,561,893 | 2/1971 | Baatrup | 418/61 B |
| 3,613,364 | 10/1971 | Goff | 91/467 |
| 3,687,578 | 8/1972 | White et al. | 418/61 B |

FOREIGN PATENT DOCUMENTS

| | | | |
|---|---|---|---|
| 1553287 | 4/1970 | Fed. Rep. of Germany | 418/61 B |

*Primary Examiner*—John J. Vrablik
*Attorney, Agent, or Firm*—Yount & Tarolli

[57] ABSTRACT

A control unit for controlling fluid flow to a fluid motor and for producing a flow proportional to the rate of rotation of an input shaft and for applying a pressure to the fluid motor proportional to the applied torque on the input shaft. The control unit includes a valve means for directing fluid to a fluid motor in response to rotation of the input shaft. The valve means includes a fixed valve part and a movable valve part. The movable valve part is moved to effect actuation of the valve through a gerotor gearset mechanism which also functions to meter the flow of fluid which is directed to the fluid motor.

37 Claims, 19 Drawing Figures

HYDROSTATIC CONTROL UNIT

Matter enclosed in heavy brackets [ ] appears in the original patent but forms no part of this reissue specification; matter printed in italics indicates the additions made by reissue.

BACKGROUND OF THE INVENTION

The present invention relates to a hydraulic control unit which is operative to control the flow of fluid to a hydraulic motor, such as a steering motor, in the steering system of a vehicle. The control unit is applicable to controlling the flow of fluid to different types of hydraulic motors and which motors may be used for a variety of different purposes.

Hydraulic control units which are operated upon the manual steering of a vehicle to direct the flow of fluid to a steering motor associated with the steering mechanism of the vehicle are known. Many patents disclosed such structures. Examples of such structures are shown in U.S. Pat. Nos. 2,984,215; 3,443,378; and 3,613,364.

The known designs, as typified by the abovementioned patents, include a valve mechanism which is operated upon turning of the steering wheel of the vehicle to direct the flow of fluid to the steering motor. The valve is associated with a gerotor gearset such that the fluid flows through the gerotor gearset and then into the steering motor. The gerotor gearset meters the flow of fluid to the steering motor as the steering wheel is turned so that there is a proper follow-up relationship between the turning of the steering wheel and the turning of the dirigible wheels of the vehicle for effecting steering of the vehicle. In general, the known designs are relatively expensive to manufacture and are relatively complicated. In addition, the known designs are relatively large in size due to the structural relationship of the parts thereof.

Typical of the present commercial designs is that the valve mechanism which controls the flow of fluid to the steering motor is a rotary valve, i.e., the valve has a valve part directly connected to the steering wheel to rotate upon rotation of the steering wheel. This results in the need for an interconnection between the steering shaft and the rotating valve part. The juxtaposition of the various parts has resulted in the need for the steering shaft or a part connected therewith to extend through or into the rotary valve so as to be mechanically interconnected with the rotatable valve part. This has resulted in the necessary requirement that the rotary valve has a diameter which is of sufficient size to allow for the steering shaft to be so positioned. This likewise has resulted in a relatively large package size for the unit, and creates leakage problems.

While systems are known which do not incorporate a rotating valve, such as typified by U.S. Pat. Nos. 2,321,377 and 3,360,932, such systems have not had significant commercial acceptance, and will not be discussed in detail.

SUMMARY OF THE PRESENT INVENTION

The present invention provides a substantially improved control unit of the above-noted type. The control unit of the present invention is simpler in construction, may be constructed in a small package size, and may be substantially less expensive to manufacture than those constructions typified by the abovementioned prior art.

These substantial advantages are achieved by the present invention primarily by the elimination of a rotary valve in the system, and more specifically by the elimination of a valve part which is rotated at all times with the steering wheel. In the present invention there is no rotating valve part which is directly connected with the steering wheel to rotate therewith. Accordingly, the diameter of the valve mechanism may be made small. Accordingly, package size and leakage problems are minimized and a substantial simplification in the system is effected.

The present invention includes a valve which is operated upon initial turning of the steering wheel from a neutral position to an actuated position for directing the flow of fluid to the steering motor. This actuation is effected through and by initial rotation of the parts of a metering means which is associated with the valve. Specifically, in the present invention the steering wheel is directly connected to a first member of a metering means, which metering means is in the form of a gerotor gearset. The initial rotation of that first member of the geroter gearset causes a torque to be applied to the second member of the gerotor gearset and this torque is applied to the valve to effect shifting thereof against a bias through a mechanical interconnection between the second member of the gerotor gearset and the valve. The torque applied to the valve is a function of the pressure across the gerotor gearset and that pressure is a function of the torque applied to the steering wheel. Accordingly, the faster the steering wheel is turned, the greater the torque applied to the valve and the larger the volume of fluid ported to the steering motor. The degree of movement of the valve is slight and stops are provided to prevent excessive movement of the valve on excessive applications of torque thereto.

The present invention may be embodied in a variety of different control unit structures, and further features and advantages of the present invention will be apparent from the detailed description of structures which embody the present invention and which description is made with reference to the drawings.

DESCRIPTION OF THE PREFERRED EMBODIMENTS

Figure 1:
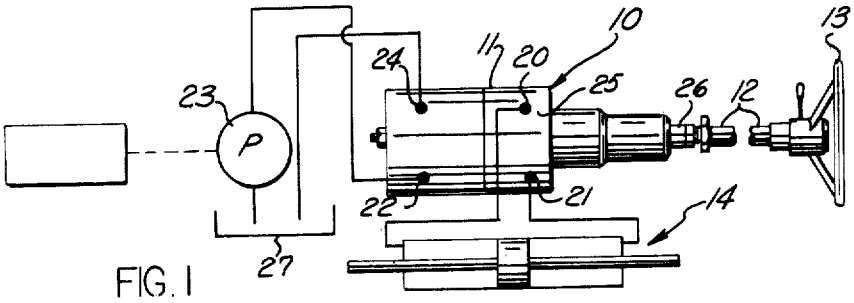
FIG. 1 is a schematic view illustrating the control unit of the present invention in a steering system.

As noted above, the control unit of the present invention may be embodied in a variety of different structural embodiments. Moreover, the control unit of the present invention may be applied to a variety of different uses. As representative, FIG. 1 illustrates a control unit 10 which for purposes of illustration is used in a steering control system for steering a vehicle.

The control unit 10 includes a housing 11 into which a steering shaft 11 of a vehicle extends. At the outer end of the shaft 12 a steering wheel 13 is connected so that upon turning of the steering wheel the shaft 12 likewise turns and the control unit 10 is operated to direct steering control fluid to a steering motor 14 which is suitably connected to effect power-assisted steering of the wheels of the vehicle. The interconnection between the motor 14 and the mechanism of the vehicle for effecting steering thereof will not be described, since such is conventional and known.

As shown in FIG. 1, the housing 11 includes two outlet ports 20, 21, respectively, which are connected to opposite sides of the motor 14 so that when fluid flows from those outlets, the fluid flows into one or the other of the ends of the motor 14. In addition, the housing 11 includes an input port 22 which is connected to an engine-driven pump 23. The housing also includes an outlet port 24 which is connected to a fluid reservoir 25.

The control unit 10 functions so that when no steering of the vehicle is occurring, fluid is directed by the pump 23 into the inlet 22 in the housing 11 and from the outlet 24 to the reservoir in a continuous manner. However, if the operator is turning the steering wheel, the unit 10 operates to direct fluid from the inlet 22 to one or the other of the outlets 20, 21 depending upon the direction of turning of the steering wheel. The other of the outlets 20, 21 is connected with the outlet 24 so that fluid therefrom is directed to the reservoir 25.

Figure 2:
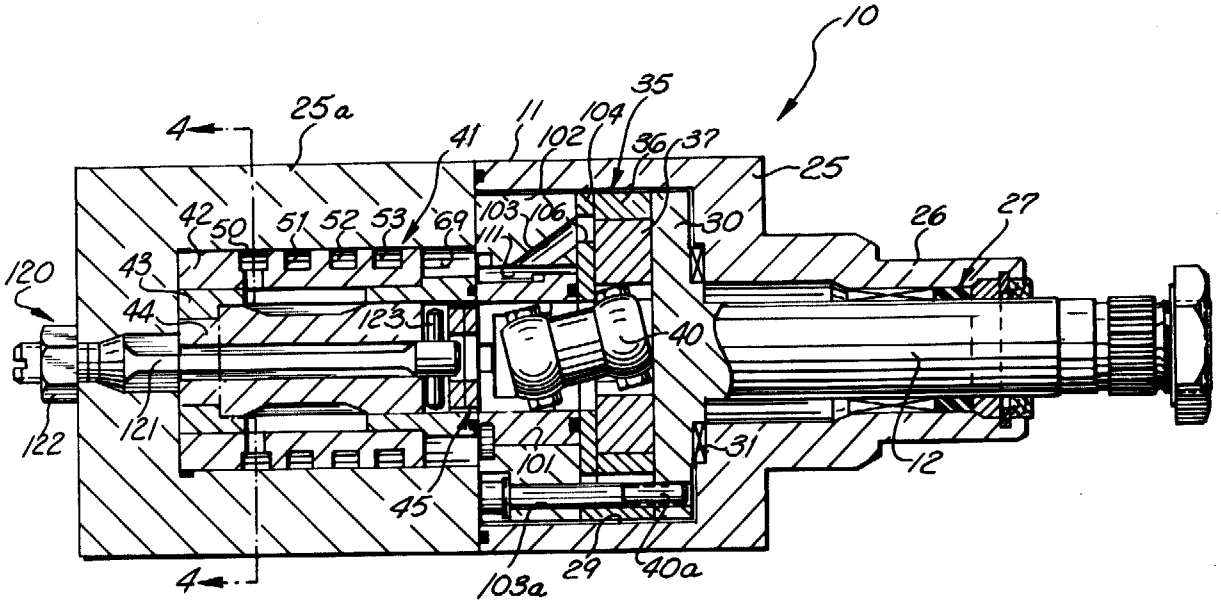
FIG. 2 is an axial cross-sectional view of the control unit shown in FIG. 1.

As shown in FIG. 2, the housing 11 of the control unit 10 includes housing portions 25, 25a. The housing portion 25 has a projecting portion 26 into which the steering shaft 12 extends. A suitable seal and bearing arrangement, generally designated 27, is associated with the housing portion 26 and the shaft 12 so as to support the shaft 12 for rotation relative to the housing and prevent any leakage of fluid along the shaft 12. The shaft 12 terminates in a chamber 29 in the housing portion 25 and specifically a flange portion 30 of the shaft 12 is located in the chamber 29. Suitable axial thrust bearings 31 are interposed between a radial face of the flange portion 30 and a radial surface of the housing portion 25, as shown in FIG. 2.

Figure 3:
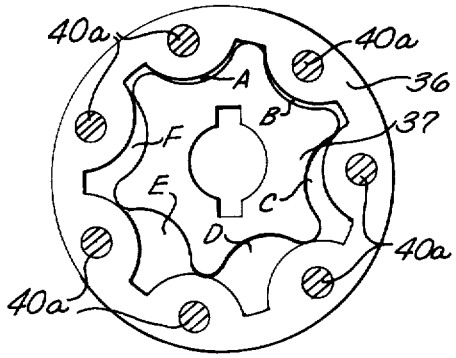
FIG. 3 is a view illustrating a gerotor gearset embodied in the unit of FIG. 1.

In accordance with the present invention, a fluid metering means, generally designated 35, is located in the chamber 29. The metering means 35 comprises a gerotor gearset which includes an outer member 36 which has internal teeth thereon and an inner member 37 which has external teeth thereon. The teeth of the members 36, 37 are intermeshed, as best shown in FIG. 3. The gerotor metering mechanism 35 may be of conventional construction and will not be described in detail, since gerotor mechanisms are known.

The gerotor member 36 is supported for rotation about an axis coextensive with the axis of rotation of the shaft 12. In addition, the outer gerotor member 36 is secured to the flange portion 30 of the shaft 12 by means of a plurality of suitable screw fasteners 40a so that upon rotation of the shaft 12 the outer gerotor member 36 is likewise rotated about the axis of rotation of the shaft 12. The initial rotation of the outer gerotor member 36 with the shaft 12 effects rotation of the rotor member 37 about its own axis. After the rotor member rotates through a small angle of rotation about its own axis, it is restrained from further rotation about its own axis, and thus on further rotation of the member 36, the member 37 orbits about the axis of rotation of the member 36, all of which will be described in greater detail hereinbelow. Of course, as the rotational and orbiting relative movement of the members 36, 37 occurs, the pockets which are defined by lobes of the members 36, 37 and which are designated A-F in FIG. 3 expand and contract.

The rotor member 37 is mechanically connected by a drive link 40 to a valve mechanism, generally designated 41. The valve mechanism 41 is constructed to direct fluid flow to the steering motor 14 when actuated from a neutral condition. In its neutral condition the valve 41 directs fluid from inlet 22 to outlet 24. When actuated, the valve mechanism 41 directs flow from inlet 22 to either port 20 or 21 and connects the other port 20 or 21 to outlet 24, depending on the steering direction. The valve mechanism 41 is actuated through the drive link 40 by the initial slight rotation of the rotor member 37.

The valve mechanism 41 is located in the housing portion 25a of the unit 10. The valve mechanism 41 comprises an outer valve sleeve 42 (see FIG. 2) which is rigidly and fixedly secured in a suitable manner in the housing 11, and a second or inner sleeve portion 43 which is fixedly and rigidly secured to the outer sleeve portion 42. The two sleeves 42 43, since they are assembled together in a fixed relationship and are fixed within the housing 11, may be considered to be a single valve element and could be so constructed.

The valve mechanism 41 further includes a movable valve part which is designated 44 and which is located within the valve sleeve member 43. The valve part 44 is supported for limited rotary movement within the valve sleeve 43 upon rotation of the rotor member 37. The right end of the valve member 44, as viewed in FIG. 2, is mechanically connected by a connection 45 to one end of the commutator valve 101, to be described hereinbelow. Accordingly, upon torque being applied to the rotor member 37, the drive link 40 transmits that torque to the valve member 44 through the commutator valve 101, and the mechanical connection 45. In the description below, the slots in the sleeve 43 are given the same reference number as the openings in the sleeve 42 with which they communicate.

Figure 5:
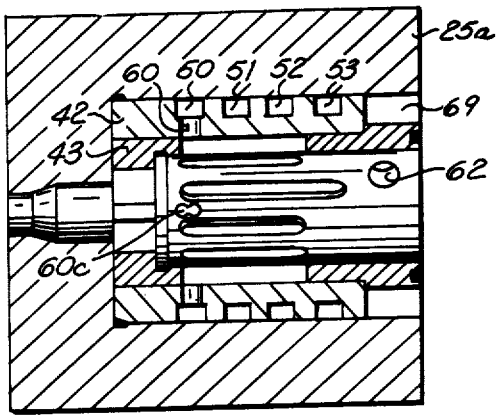
FIG. 5 is a cross-sectional view of valve parts used in the embodiment of FIG. 2.
Figure 6:
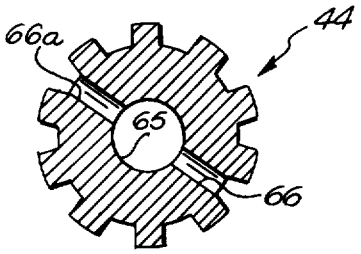
FIGS. 6 and 7 are sectional and plan views of another valve part used in the embodiment of FIG. 2.
Figure 7:
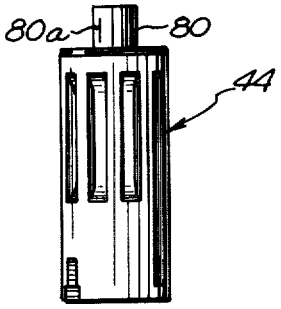

The valve member of outer sleeve 42 is provided with a series of four annular grooves extending therearound and which are designated 50–53. The grooves 50–53 at various locations have openings provided therein for directing fluid flow radially inwardly, all of which will be described in greater detail below. The inner sleeve member 43 likewise has a plurality of slots therein, see FIG. 5, which extend axially, and underlie the plurality of the radial grooves 50–53. The mechanical connection 45 will not be described in detail, but in general it comprises a hollow cylindrical member which is keyed to both the commutator valve 101 and valve 44. It does not interfere with fluid flow therethrough as will be apparent. The valve member 44, shown in FIGS. 6 and 7, is provided with a series of lands and grooves which extend axially of the valve member 44.

As noted above, when no steering is occurring, the valve connections are such that fluid flows directly from the inlet 22 to the outlet port 24 through fluid passageways in a manner which will be described hereinbelow. In addition, when the valve member 44 is moved due to rotation of the steering wheel, fluid flows from the inlet port 22 through the valve mechanism 41 and the metering mechanism 35 and to one of the outlet ports 20 or 21 to one end of the motor 14. The return flow is from the other of the outlet ports 20 or 21 through the valve mechanism 41 and to the reservoir 25. Whether the flow is through the metering motor 35 to the port 20 or 21 depends upon the direction of rotation of the steering wheel 13. The detailed operation of the valve is best illustrated in schematic FIGS. 8–10 which illustrate respectively the neutral position, a right-turn position, and a left-turn position of the valve parts.

Figure 8:
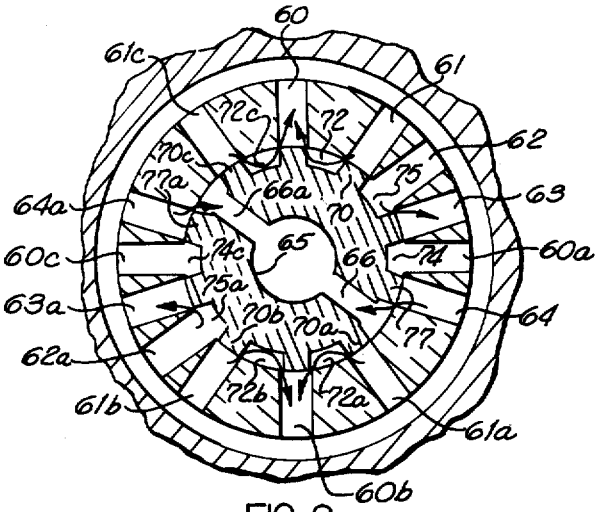
FIGS. 8–10 are schematic views illustrating the flow of fluid through the valve mechanism embodied in FIG. 2.

FIG. 8 specifically illustrates the flow through the valve mechanism 41 when the valve mechanism 41 is in its neutral condition. As noted above, the valve sleeve 42 includes four annular grooves which extend circumferentially therearound and which are designated 50, 51, 52 and 53. Groove 50 communicates with the outlet port 24 and there are four radially extending holes 60, 60a, 60b, 60c in valve sleeve 42 which communicate with the groove 50. The annular groove 51 communicates with the inlet port 22 and there are four radially extending holes designated 61, 61a, 61b, 61c in valve sleeve 42 which communicate with the annular groove 51. The annular groove 52 communicates with the outlet port 20 leading to one side of the motor 14 and there are radially extending holes 64, 64a in the valve sleeve 42 which communicate with the groove 52. The annular groove 53 communicates with the outlet port 21 and there are likewise radially extending holes 63, 63a in the sleeve member 42 which communicate with the annular groove 53.

In addition, the area of the sleeve assembly designated 69 communicates with one side of the metering mechanism 35, as will be described in detail hereinbelow. To provide for this communication, the inner valve sleeve 43 includes two radial openings 62, 62a which communicate fluid to the area 69. In addition, the valve member 44 is provided with an axial passage 65 which communicates with the other side of the metering mechanism 35 and radial passages 66, 66a therein communicating with the axial passage 65.

As shown schematically in FIG. 8, when the valve member 44 is in its neutral position, lands 70, 70a, 70b, 70c are located adjacent the inlets 61, 61a, 61b, 61c, respectively. The lands 70, 70a, 70b, 70c do not block flow of fluid from the inlets 61–61c into grooves 71, 72a, 72b, 72c in the valve member 44. The grooves 72, 72c communicate with the outlet 60, and the grooves 72a, 72b communicate with the outlet 60b. Accordingly, when the valve member 44 is in its neutral position, the flow of fluid from the inlets 61–61c is directed through the valve mechanism 41 to the outlet 24 and to the reservoir 25. Thus, the valve mechanism may be termed open center. It should be clear, however, that a closed center valve could also be utilized in the system. The other reservoir ports 60a and 60c communicate with grooves 74, 74a in the valve member 44 which are adjacent the ports 60a, 60c but are blocked by the adjacent lands from communicating with adjacent ports.

Moreover, in the neutral condition of the valve parts, as shown in FIG. 8, the openings 62 and 62a which communicate with the metering mechanism are also in communication with grooves 75, 75a, respectively, in the outer periphery of the valve member 44. The grooves 75 and 75a are located so as to provide communication with openings 63, 63a in the valve mechanism 41. The openings 63, 63a, of course, communicate with one end of the steering motor 14. Moreover, the openings 64, 64a, when the valve member 44 is in its neutral condition as shown in FIG. 8, are located immediately adjacent lands 77, 77a, respectively, in the valve member 44. The lands 77, 77a are likewise constructed so as not to block communication between the openings 64, 64a and the openings 66, 66a, respectively, in the valve member 44. Thus, when the valve member 44 is in its neutral condition, the opposite ends of the steering motor are connected across the metering mechanism 35 providing an "open cylinder" system. This construction permits the transmission of any forces which are applied to the wheels of the vehicle to be transmitted back through the hydraulic fluid in the system to the gerotor mechanism 35, tending to cause the gerotor mechanism to operate as a motor. This provides a "feel" to the operator of any such forces.

As noted above, the valve member 44 is moved or rotated from its neutral position in response to rotation of the steering wheel to direct fluid to the steering motor 14 for purposes of steering. Moreover, as noted above, the valve member 44 is rotated due to torque applied thereto through the rotor member 37 and the drive link 40. As should be apparent to those skilled in the art, the rotor member 37 is rotated due to forces which act on the member 37 upon rotation of the steering wheel. These forces involve a mechanical or gear reaction due to the fact that the rotor members 36, 37 have a geared interconnection therebetween. However, the pressure across the gerotor mechanism greatly affects the torque applied to the rotor member 37. If these is a low fluid pressure across the gerotor mechanism 35 due to a low differential fluid pressure across the steering motor, the torque applied to the rotate the valve member 44 is substantially lower than when there is a high differential pressure across the steering motor. Thus, the torque applied to the valve 44 is a function of the pressure required to operate the steering motor.

In this connection, the valve member is actually torque-responsive and the torque which can be applied to the valve member 44 through the gerotor mechanism 35 from the steering wheel 13 is proportional to the fluid pressure in the gerotor mechanism which in turn is responsive to the pressure differential across the steering motor. The greater the torque applied to the steering wheel, the greater the torque applied to the valve member 44 and the farther the valve member 44 will rotate.

Figure 4:
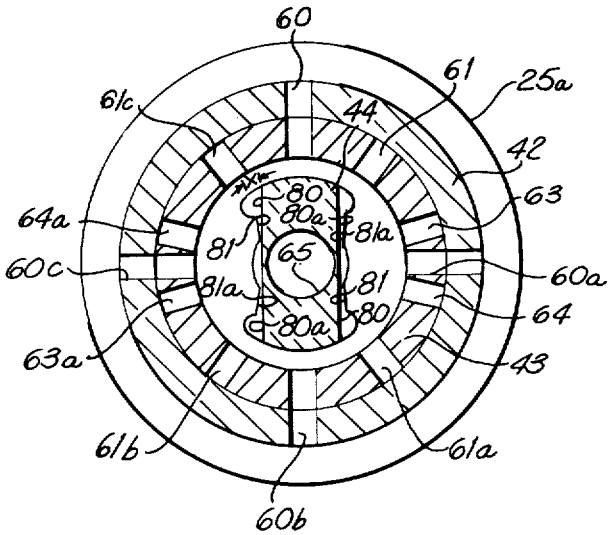
FIG. 4 is a cross-sectional view of the unit of FIG. 2, which parts omitted, taken along the section line 4—4 of FIG. 2.

In the event high torque is applied to the valve member 44 in one direction, the valve member 44 may move to its extreme position in that direction wherein surface portions 80 of the valve member 44 engage surface portions 81 of the sleeve member 43. If the rotation of the rotor member 37 is in the opposite direction, again the valve member 44 can only rotate until surfaces 80a, 81a engage. As can be viewed in FIG. 4, the amount of rotation of valve member 44 which can occur is very slight and is designated X in FIG. 4. Once the surface portions 80, 81 or 80a, 81a engage, further rotation of the valve member 44 is positively prevented. In many steering conditions, the torque applied to the steering wheel by the operator will be of a magnitude where the valve member 44 rotates a very slight increment less than its full capability for rotation. Thus, the valve member 44 in many steering conditions will move to an intermediate position rather than to a full indexed position where the stops 80, 81 or 80a, 81a engage.

Accordingly, for purposes of steering, the valve member 44 will take a position in which it divides the flow of fluid from the pressure ports 61–61c between the outlet ports 60, 60b, on the one hand, and the metering mechanism 35, on the other hand.

For example, if the valve member 44 is rotated in a clockwise direction, as viewed in FIG. 8, to a very slight extend such that communication between the ports 61–61c and ports 60, 60b is not blocked off, it should be clear that there will be a pressure increase in the ports 61–61c. This will be due to the fact that the flow area of communication between the ports 61–61c and the ports 60, 61b decreases. At the same time, ports 61a, 61c will communicate with passage 66, 66a, respectively, in the valve member 44 for directing fluid to the metering mechanism 35. Also, the area of communication between ports 62, 62a and the ports 63, 63a, respectively will increase so that fluid will be directed from the metering mechanism through the ports 63, 63a and to one side of the steering motor. The opposite side of the steering motor will be connected to tank due to the fact that ports 64, 64a will communicate with tank through ports 60a, 60c in the valve mechanism. As a result, the flow from the inlet pressure ports 61–61c will be divided depending upon the amount of rotation of the valve 44. This provides for a pressure build-up in the steering motor 14 which is proportional to the amount of rotation of the valve member 44, and the valve member 44 moves in proportion to the torque applied to the steering wheel providing an effective follow-up steering system with a smooth pressure build-up in the steering motor 14 to effect steering rate proportional to the rate of rotation of the steering wheel.

In the event that the valve member is rotated in a counterclockwise direction, as viewed in FIG. 8, the pressure directed to the valve member between inlets 61–61c may again be divided in much the same manner as that described above, except for the fact that the fluid is directed through the valve mechanism to the opposite end of the steering motor. In the event the direction of rotation is counterclockwise of the valve member 44, pressure in the openings 61–61b is directed to the metering mechanism 35 through ports 62, 62a and the flow is from the metering mechanism 35 through ports 64, 64a to one end of the steering motor 14. The opposite ends of the steering motor are connected to tank by connection of ports 63, 63a with tank outlets 60a, 60c, respectively. Again, in this mode of operation the flow being divided between the outlet and the steering motor, a smooth increase in the buildup of fluid pressure in the steering motor is provided in a manner which is proportional to the torque applied to the steering wheel.

Figure 9:
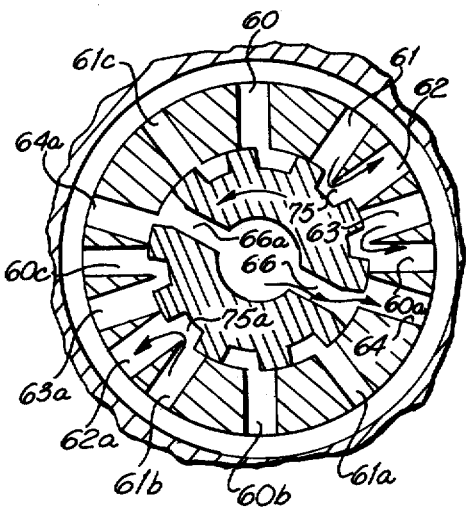

In the event that the member 44, as shown in FIG. 8, is moved or rotated in a counterclockwise direction from the position shown in FIG. 8 to the position shown in FIG. 9, the inlet flow is no longer divided as described above. As shown in FIG. 9, the inlet fluid flow which flows into the valve from the pump 22 into passages 61, 61b flows to the metering mechanism 35 through passageways 62, 62a. Flow from the metering pump flows axially through the internal passage 65 of the valve 44 and then radially through the openings 66, 66a and into outlet connections 64, 64a to one side of the steering motor 14. The flow from the other side of the steering motor 14 is through the conduit, into the housing through the port 20, through the radial passageways 63, 63a, and through the outlet ports or passages 60a, 60c, respectively, to the reservior 25. In this manner, the fluid flows from pump 23 through the valve mechanism 41 to the metering mechanism 35 and through the metering mechanism 35 back through the valve mechanism 41 to the steering motor 14 to effect steering of the vehicle.

Figure 10:
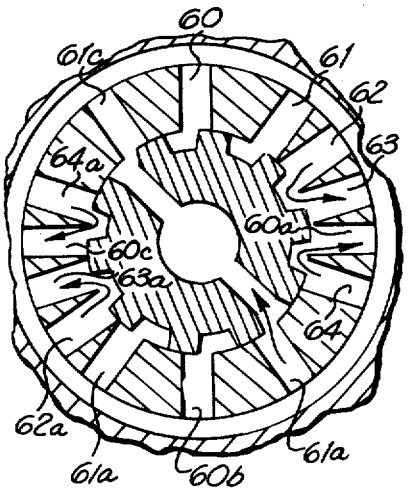

In the event that the valve is rotated from its FIG. 8 position, clockwise as viewed therein, from the position shown in FIG. 8 to the position shown in FIG. 10, the vehicle is steered in an opposite direction as compared with FIG. 9. As shown in FIG. 10, when the valve parts are moved to such position, the fluid flow is from the inlet ports 61a, 61c through the radial passages 66, 66a and axial passage 65 in the valve member 44 to the metering mechanism 35. The flow from the metering mechanism 35 flows through the ports 62, 62a and through the ports 63, 63a to one end of the steering motor 14 to effect steering of the vehicle in a direction opposite the direction of steering in FIG. 8. The flow from the other end of the steering motor is through the port 21, the radial passages 64, 64a and through the outlet ports 60a, 60c which are connected to the reservoir 25. Accordingly it should be clear that depending upon the direction of rotation of the valve member 44, the vehicle will be steered in a respective direction.

FIGS. 8, 9 and 10 somewhat schematic and exaggerated in order to show the schematic operation of the valve mechanism 41. The detailed views of the valve mechanism, as shown in FIGS. 4–7, show a structure incorporating the flow described in connection with FIGS. 8–10. These details will not be further described herein in view of the fact that the specific structure is not essential to the present invention as long as the schematic flow illustrated in FIGS. 8–10 is provided. The reference numbers shown on the detailed figures correspond with the schematic views.

As is shown, a commutator valve arrangement is utilized with gerotor gearsets for controlling the flow of fluid into and from the gerotor mechanism. The commutator arrangement which may be utilized in the present invention may take a variety of different constructions, and insofar as the broad aspects of the present invention are concerned, any type of commutator valve mechanism may be utilized which provides for the flow of fluid from the valve mechanism 41 to the metering means, and from the metering means back through the valve mechanism.

In the embodiment of FIG. 2, the flow from the valve mechanism 41 to the metering means and from the metering means 35 back to the valve is effected through a commutator valve member 101 and a manifold member 102. The manifold member 102 has a plurality of angled passages 103 for directing flow into and from the expanding contracting pockets of the gerotor mechanism, as the case may be. The manifold 102 also includes a plurality of openings 103a through which the screw fasteners 40a extend. The face of the manifold 102 adjacent the gerotor includes a plurality of openings where passages 103 intersect that face of the manifold for directing fluid to or from the gerotor. Rigidly securing abutting the manifold 102 is a plate member 104. The plate member 104 also has a plurality of openings for receiving the screw fasteners 40.

The plate member 104 also has a plurality of openings 106 which align with the passages 103 in the face of the manifold member 102. The member 104 has an internal diameter which is substantially smaller than the internal diameter of the manifold member 102 and is provided in order to seal the gerotor mechanism. A suitable seal is provided between the face of the commutator valve member 101 and the radial face on the member 104 adjacent its internal diameter.

Figure 11:
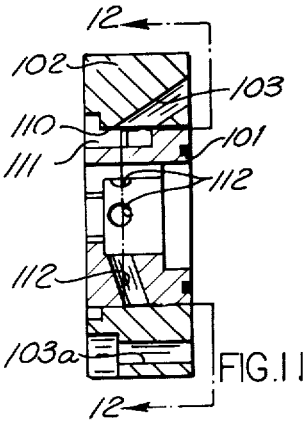
FIG. 11 is a sectional view of a commutating valve arrangement of the embodiment of FIG. 2.
Figure 12:
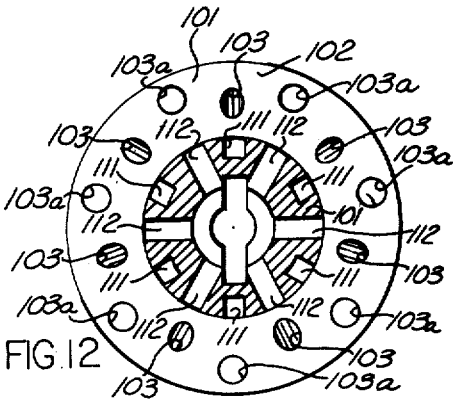
FIG. 12 is a sectional view taken approximately along the line 12—12 of FIG. 11.

The commutator valve member 101 is located within a bore 110 in the manifold member 102, (see FIGS. 11, 12). The outer periphery of the commutator valve member 101 is provided with a plurality of axial slots which are designated 111. There are six axial slots in the outer periphery of the member 101 in the embodiment disclosed. The axial slots 111 communicate with the area 69 located radially outwardly of the valve member 103. The commutator valve also has interposed between the radial slots a plurality, again six in number, of radially extending passages 112 which extend into the interior of the commutator valve member 101.

As noted above, the manifold member 102 has a plurality of passages, namely, seven in number, which are designated 103. These passages 103 extend angularly through the manifold member 102 and intersect the radial face of the manifold member as well as the axial bore 110 therein. The openings provided by the passages 103 within the bore 110 are spaced circumferentially around the bore 110.

From the above, it should be apparent how the commutator valve mechanism works. It should be clear that the manifold member 102, the plate member 104, and the outer gerotor member 36 rotates as a unit with the steering shaft 12. It should be further apparent that as the manifold member 102 rotates relative to the commutator valve 101, the axial passages 103 sequentially come into communication with the axially extending slots 111 in the outer periphery of the commutator valve member 101 and the radially extending passages 112 in the commutator valve member 101. As a result, the proper commutation of fluid flow is provided by the commutator valve mechanism.

Accordingly, as a result, fluid may flow to the metering mechanism 35 from the area 69, through the axially extending slots 111 in the commutator valve, the angled passageways 103, the openings 106 in the member 104, and into the expanding passages of the metering mechanism. The flow from the contracting passages of the metering mechanism 35 would be through openings 106 in the plate member 104 which communicate with the contracting chambers of the gerotor, passages 103 in the member 102, and radial openings 112 in the commutator member 101, into the interior of the commuator valve member 101. The fluid may then flow axially through the interior of the mechancal connection 45 and into the axial passageway 65 in the valve member 44. Of course, in the event that the gerotor mechanism rotates in a reverse direction, the flow would be reversed from that described immediately hereinabove, namely, the flow would be from the axial passageway 65 in the valve member 44, through the passages 112 in the commutator valve member 101, through the angled passages 103 in the manifold 102, passages 106 in the member 104, and into the expanding chambers of the gerotor mechanism. In this case, the flow from the contracting chambers of the gerotor mechanism would be through the ports 106 of the member 104, into passages 103 of the manifold 102, through axial passages 111 in the outer periphery of the commutator valve 101, and into the area 69 adjacent the outer periphery of the valve mechanism 41.

From the description hereinabove, it should be apparent that upon rotation of the steering wheel, the valve member 44 is moved slightly in order to effect communication of the various ports in the valve mechanism and the propor actuation of the steering motor 14. The movement of the valve member 44 by the gerotor mechanism 35 is effected against the bias of a suitable spring means, generally designated 120. The spring means in the embodiment shown comprises a torsion bar 121 which is suitably secured at one end by a screw-and-nut assembly 122 to the housing of the control unit and is secured at the other end by a pin-and-slot connection, generally designated 123, to the valve member 44. It should be apparent, of course, that upon rotation of the valve member 44, the rotation is in opposition to the force applied to the valve member by the torsion bar 122, and that when that force is removed as by removal of the steering force applied to the steering wheel of the vehicle, the torsion bar 121 will effect a return of the valve member 44 to its neutral position. Of course, while a torsion bar spring centering mechanism is disclosed in the specific embodiment, any such biasing arrangement may be utlized in order to provide for a neutral positioning of the valve member 44. The torsion bar extends into the interior passageway 65 of the valve member 44 but it does not detrimentally affect fluid flow therethrough.

From the above description, it should be apparent that applicant has provided a control unit in which there is no rotary or rotating valve which rotates at all times upon rotation of the steering wheel. The valve 44 rotates for a small increment of movement and no more rotation thereof occurs while steering of the vehicle is being accomplished. Moreover, it should be clear that the steering shaft does not extend into the valve unit and has no mechanical interconnection with the valve member 44 except through the gerotor mechanism 35, as specificaly described above. As a result, there is no need for a large package size in order to accomplish a mechanical interconnection of the steering shaft to a rotating valve member. As a result the diameter of the valve members 42–44 may be quite small.

Moreover, it should be clear from the above that initial rotation of the steering shaft causes actuation of the valve in order to port fluid through the metering mechanism 35 and from the metering mechanism to the steering motor in a proper follow-up manner.

Also, it should be clear that in the event that the power-steering pump 23 should not operate properly, the turning of the steering wheel will still cause actuation of the valve member 44 through the metering mechanism 35 and that on further rotation of the steering shaft the metering mechanism 35 will operate as a pump mechanism to force fluid through the system and still operate the steering motor 14, even though the power-steering pump 23 may be inoperative.

Furthermore, all of the advantages of "feel" of the road in both a nonsteering condition and a steering condition are effected and provided by the control system of the present invention. Accordingly, the control system of the present invention, as described hereinabove, has all of the advantages of present and known control systems, but yet is a substantial improvement over known systems in that the cost of manufacture and the simplicity of construction are substantially improved and problems of leakage and package size are minimized.

While a specific embodiment of the present invention has been described hereinabove, it should be apparent that the present invention may be embodied in other structures which are modifications of that disclosed hereinabove.

Figure 13:
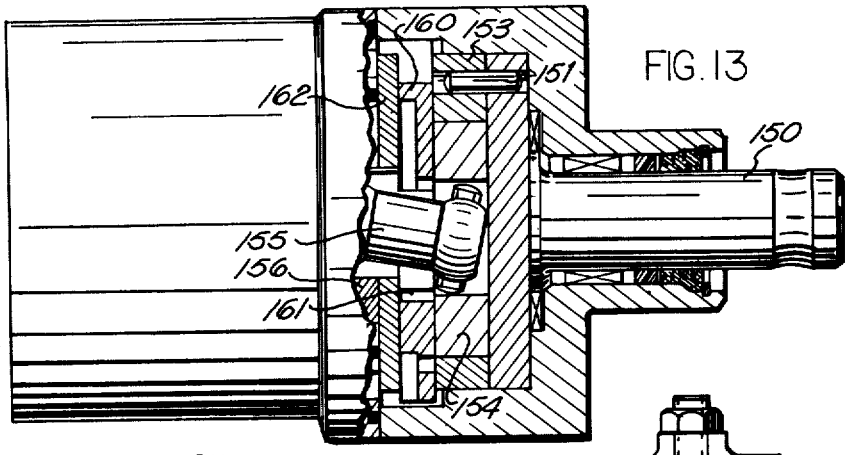
FIG. 13 is a schematic view of a modification embodying the present invention.

FIG. 13 discloses another embodiment of the present invention which is constructed similarly to that described hereinabove and uses a valve mechanism similar to that described above, although the structure of the gerotor commutator arrangement is slightly different. In the embodiment of FIG. 13, the steering shaft 150 is drivingly connected by a pin connector 151 to the rotor or outer member 153 of a gerotor mechanism. The inner rotor member 154 of the gerotor mechanism is drivingly interconnected with a drive link 155. The drive link 155 in turn is drivingly connected with a part which may be integral with the valve mechanism or drivingly connected therewith. That part is designated 156. In the embodiment shown, the commutation is through a plate-type valve, generally designated 160, the commutator valve 160 is suitably keyed to the rotor member 154 by a sleeve connector 161 so as to rotate and orbit with the rotor member. The commutation is generally similar to known structures and therefore will not be described in further detail. The plate 162 which is interposed between the housing and the commutator plate 160 functions to project radially inwardly to provide a proper seal for the commutator plate.

Figure 14:
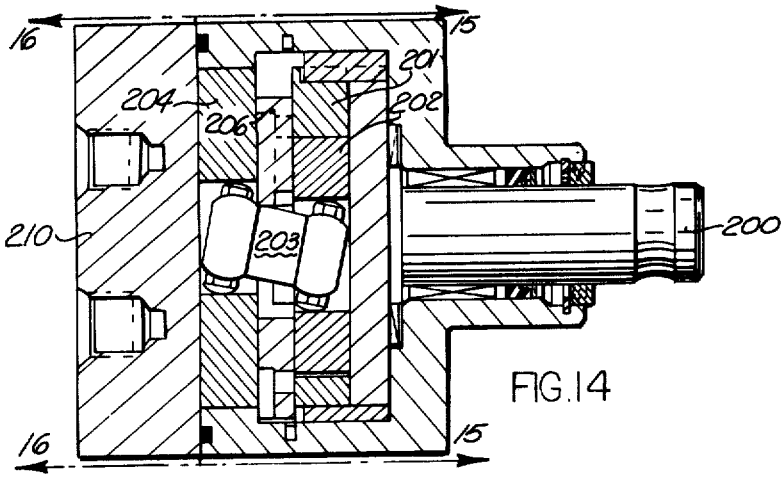
FIG. 14 is a schematic view of another modification embodying the present invention.
Figure 16:
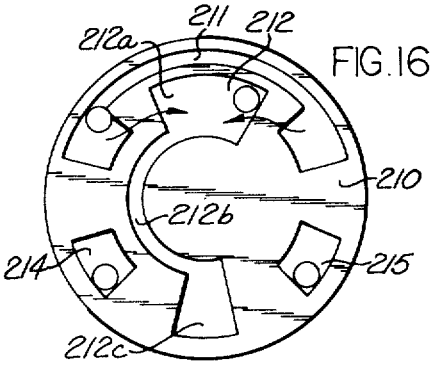
FIG. 16 is a schematic view taken approximately along line 16—16 of FIG. 14.
Figure 15:
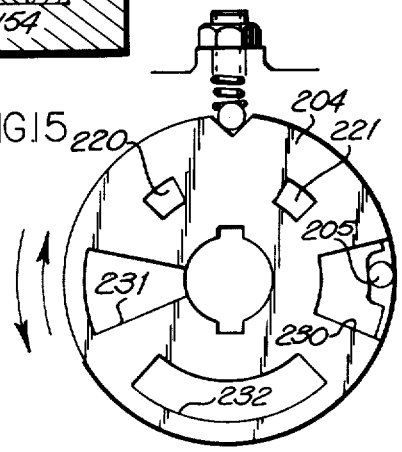
FIG. 15 is a schematic view taken approximately along the line 15—15 of FIG. 14.

FIGS. 14, 15 and 16 illustrate a still further embodiment of the present invention which is somewhat similar to the embodiment of FIG. 13, except that as opposed to a rotary valve or axial valve of the type shown in the embodiments of FIGS. 1–12, the valve of FIGS. 14–16 is of a plate type.

In the embodiments of FIGS. 14–16, the steering shaft 200 is drivingly connected to the outer rotor member 201 of a gerotor gearset which in turn drives the inner rotor member 202 of the gerotor gearset. The inner rotor member 202 is drivingly connected through a link 203 to a plate valve member 204. The valve member 204 will rotate upon rotation of the steering shaft, much as the valve member 44 rotates, and a suitable stop pin, shown in FIG. 15, and designated 205, will engage a surface of the valve to prevent excessive rotation of the valve member 204 in any direction upon high torque being applied thereto. The commutator valve member 206 is similar in construction and operation to that of the embodiment of FIG. 13 and will not be described in detail, since it is generally of conventional construction.

As best shown in FIG. 16, the housing 210 which contains the control unit has an inlet port configuration which includes a generally arcuate U-shaped portion 211 which communicates with the inlet pump and which may be termed an inlet pressure port. A return reservoir port which is generally designated 212 includes a portion 212a which is interconnected by an arcuate portion 212b with a portion 212c which is diametrically opposed to the portion 212a. Also, on the housing there is a port 214 which communicates to one end of the steering motor and a port 215 which communicates to the other end of the steering motor.

The valve member 204 which engages with the face of the housing, as shown in FIG. 16, includes a pair of ports 220, 221 which, when the valve is in neutral position, provides for communication between the inlet pressure port 211 and the outlet reservoir port 212. Accordingly, when the valve is in its neutral position, the flow of fluid is from the pressure pump through the valve mechanism to tank.

In the event that the valve member shown in FIG. 15 is moved in one direction relative to the housing 210, a port 230, which communicates to one side of the gerotor mechanism, will move into communication or greater communication with the port 211 so that pressure is thereby ported to the gerotor mechanism. At the same time, the other side of the gerotor mechanism, which communicates with port 231, will communicate with the port 215 to direct flow to one end of the steering motor. The flow from the other end of the steering motor will return from port 214 to the outlet port 232 and will be communicated to outlet port 212c.

In the event that the valve plate 204 is rotated in a reverse direction, the port 231 will communicate with the inlet pressure 211 and fluid will be ported to the metering mechanism in a reverse direction from that described above through the port 231, flow from the metering mechanism will come through the port 230 through port 214 to one end of the steering motor. Flow from the other end of the steering motor will be through port 215 and into the outlet 232 which communicates with the port 212c to port the fluid to the reservoir.

Accordingly, it should be clear that the embodiment shown in FIGS. 14, 15 and 16 is similar in operation to that described above, but rather than having a sleeve-type axial valve system, it is provided with a plate-type valve. Moreover, the valve construction can be such that the proper intermediate positions of the valve are provided in order to operate in precisely the same manner as that described above in connection with the embodiment of FIG. 1 and that detailed description will not be made herein in view of the fact that it would merely involve redundancy.

While from the above it should be clear that various modifications of the present invention may be embodied in control units which include different types of commutation as well as different types of valve constructions, it should be equally clear that the present invention may be embodied in modifications where the gerotor mechanism is utilized in a different manner than that disclosed above and where the input to the gerotor mechanism may be other than an input to the outer member of the gerotor mechanism, or where the orbiting member of the gerotor mechanism is the outer member of the gerotor mechanism rather than the inner member of the gerotor mechanism.

Figure 17:
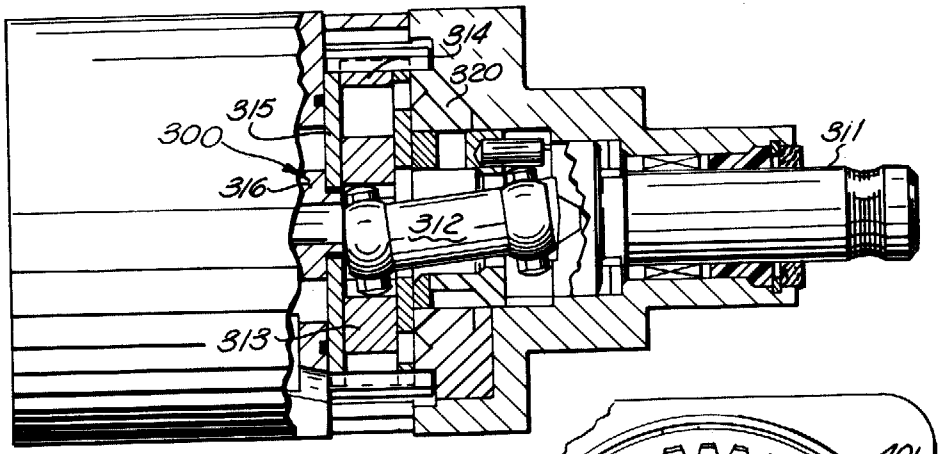
FIG. 17 is a schematic view of still another modification embodying the present invention.

In the embodiment of FIG. 17 a control unit is shown very schematically and a control valve is generally shown and designated 300. The embodiment of the present invention which is illustrated in FIG. 17 comprises a control system where the control or steering shaft 311 is drivingly connected through a linkage 312 to the inner rotor member 313 of a gerotor mechanism. The outer rotor member of the gerotor mechanism, designated 314, is constructed so as to rotate a limited amount upon rotation of the inner gerotor member 313 and a mechanism is provided, not shown, for preventing further rotation thereof. This initial rotation of the member 314 is transmitted via a mechanical connection which includes a disk or plate-like member 315 to the rotary valve member or valve member 316 of the valve mechanism 300.

The commutation in the embodiment shown in FIG. 17 is similar to the commutation which is provided in the Dettlof U.S. Pat. No. 3,087,436 and accordingly will not be described herein in detail. However, it should be apparent that the commutation is effected on the side of the gerotor which is closest to the steering shaft 311 rather than on the side of the gerotor mechanism on which the valve 300 is located, that is, the gerotor mechanism is interposed between the commutator valve and the valve mechanism 300. Also, the commutator valve part 320 is drivingly connected with the outer member 314 due to a pin connection therewith, and rotates slightly therewith upon torque application thereto through the gerotor mechanism.

Figure 19:
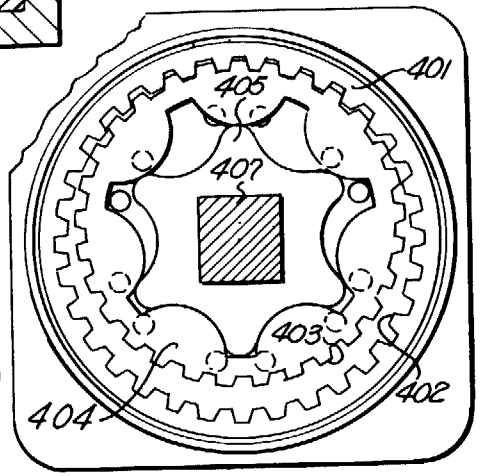
FIG. 19 is a view taken approximately along the line 19—19 of FIG. 18.
Figure 18:
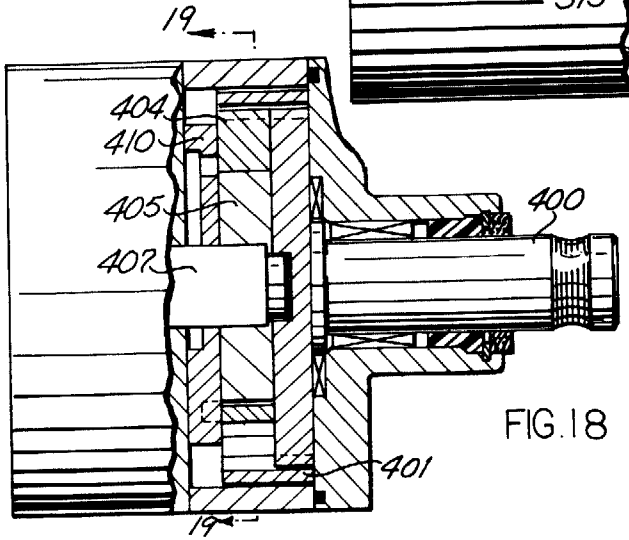
FIG. 18 is a schematic view of yet another modification embodying the present invention.

In the modification of FIGS. 18 and 19 the steering shaft 400 is drivingly connected through a gear interconnection to a sleeve member 401. The sleeve member 401 has internal gear teeth 402 thereon, best shown in FIG. 19. The gear teeth 402 mesh with gear teeth 403 on the outer peripheral surface of the outer rotor member 404 of the gerotor mechanism. The inner rotor member of the gerotor mechanism is designated 405.

In this embodiment, the initial rotation of the steering shaft 400 effects rotation of the outer rotor member 404 which in turn effects a rotation of the inner member 405 as in the embodiment of FIG. 1. The initial rotation of the member 405 effects limited rotation of either a valve plate in the embodiment of FIG. 13 or an axial-type valve, as in the embodiment of FIG. 1, to effect the proper porting of fluid by rotation of a shaft 407 connected with the valve. However, in the embodiment of FIGS. 18 and 19, the rotor can only rotate a limited amount and is also restrained from any orbiting movement. In this case, rotation of the steering shaft 400 causes rotation and orbiting of the rotor member 404 in a manner similar to that shown in U.S. Pat. No. 3,443,378. In this embodiment the commutator member 410 is fixed to the rotor member 405 in order to provide the necessary and proper commutation as the rotor member 404 rotates and orbits. Details of the valve mechanism which may be associated with the structure of FIGS. 18 and 19 will not be further described, since it would be the equivalent of that described above or obvious modifications thereof.

In view of the foregoing, it is clear that applicant has provided a substantial improvement in the art which may be embodied in a number of different modifications and structural embodiments.

What is claimed is:

[1. A control unit comprising: metering means for metering fluid flow and including first and second toothed members disposed in meshing engagement with one another; input means for rotating said first member relative to said second member; a changeover valve means for directing fluid flow to one of alternative flow paths and movable between a neutral position and first and second oppositely disposed operating positions in response to torque applied thereto by said second member for directing the metered flow of fluid from said metering means to one of said alternative flow paths.]

[2. A control unit comprising a gerotor mechanism, said gerotor mechanism comprising an internally lobed gerotor rotor member drivingly connected with an input shaft, an externally lobed gerotor rotor member located within said internally lobed gerotor rotor member, the lobes on said gerotor rotor members defining pockets which expand and contract upon relative rotational and orbital movement of said gerotor rotor members, commutator valve means for directing fluid flow to said expanding pockets and from said contracting pockets, said commutator valve means comprising a sleeve-like commutator valve member having exterior axial grooves and generally radially extending passages extending from the outer periphery thereof into the bore thereof, a manifold member having a bore within which said commutator valve member is located, said manifold member having passages extending therethrough and which alternately communicate with said axially extending grooves and said generally radially extending passages in said commutator valve member on relative rotation therebetween, and means drivingly connecting said manifold member to said internally lobed gerotor member for rotation therewith.]

[3. A control unit comprising an input shaft, housing means having a inlet port and a pair of outlet ports, a directional control valve means for porting fluid from said inlet port selectively to one of said outlet ports, said directional control valve means comprising a fixed valve means and a controlling valve member movable through a predetermined limited distance relative to said fixed valve member to control fluid flow therethrough, and metering means in said housing interconnecting said input shaft and said controlling valve member for moving said controlling valve member said limited distance in response to initial rotation of said input shaft and for directing fluid flow to said directional control valve as said shaft rotates.]

[4. A control unit as defined in claim 1 further including biasing means for urging said controlling valve member to a netural position and effective to move said controlling valve member to said neutral position upon termination of rotation of the input shaft, said metering means overcoming said biasing means to effect movement of said controlling member.]

[5. A control unit as defined in claim 1 wherein said fixed valve member and said controlling valve member comprises plate valve members movable relative to each other upon rotation of said input shaft.]

[6. A control unit as defined in claim 1 wherein said metering means comprises a gerotor mechanism having an internally toothed gerotor member and an externally toothed gerotor member, means connecting said input shaft to one of said gerotor members for rotation with said shaft, and means connecting the other of said gerotor members with said controlling valve member to move said controlling valve member.]

[7. A control unit as defined in claim 6 further including means for limiting movement of said controlling valve member relative to said fixed valve means, and biasing means for returning said controlling valve member to a neutral position relative to said fixed valve means.]

[8. A control unit as defined in claim 6 wherein said fixed valve means comprises a sleeve valve member and said controlling valve member comprises an axially extending valve member located within said fixed valve means and which rotates relative to said fixed valve means and further including a drive link interconnecting said other rotor member of said gerotor mechanism to said controlling valve member to effect rotation thereof in response to torque applied thereto.]

[9. A control unit as set forth in claim 6 wherein said other gerotor member is rotatable about its central axis in response to initial rotation of said one gerotor member to effect movement of said controlling valve member and said valve members constrain said other gerotor member to then orbit only relative to said one gerotor member during continued rotation of said one gerotor member by rotation of said input shaft when the force applied to said controlling valve member is not sufficient to move same.]

[10. A control unit as set forth in claim 6 wherein said one gerotor member comprises an internally toothed gerotor rotor member supported for rotation about the axis or rotation of the shaft and said other gerotor member comprises an externally toothed gerotor rotor member supported for rotational movement about its own axis and for orbiting movement about the axis of said one gerotor member.]

[11. A control unit as set forth in claim 6 wherein said one gerotor member comprises an externally toothed gerotor rotor member and said other gerotor member comprises an internally toothed rotor member.]

[12. A control unit as defined in claim 6 wherein said one gerotor member comprises an internally toothed gerotor rotor member which is mounted for rotary and orbital movement and said other of said gerotor members comprises an externally toothed gerotor rotor member supported for limited rotational movement for moving said controlling valve member.]

[13. A control unit for controlling fluid flow to a fluid motor, said control unit comprising housing means having an inlet port and a pair of outlet ports for communication with the fluid motor, directional control valve means for directing fluid from said inlet port selectively to one of said outlet ports in response to the direction of rotation of an input shaft, said directional control valve means including a fixed valve part and a movable valve part movable in opposite directions to direct fluid to a selected one of said outlet ports and to said fluid motor, and means for transmitting torque from said input shaft to said movable valve part to effect movement thereof, said means for transmitting torque to said movable valve part comprising metering means for directing a metered flow of fluid upon rotation of said shaft to said directional control valve means and means for transmitting torque from said metering means to said movable valve part.]

[14. A control unit as defined in claim 13 wherein said metering means comprises a gerotor mechanism having one rotor member drivingly connected with the input shaft and a second rotor member drivingly connected with said movable valve part, said gerotor mechanism transmitting a torque to said valve part which is proportional to the torque applied to the input shaft and said valve means providing a fluid pressure flow to said fluid motor depending upon the amount of movement of said movable valve part.]

[15. A control unit as defined in claim 13 further including means for limiting movement of said movable valve part relative to said fixed valve part, and biasing means for returning said movable valve part to a neutral position relative to said fixed valve part when torque application thereto is removed.]

[16. A control unit as set forth in claim 14 wherein said one gerotor member comprises an internally toothed gerotor rotor member supported for rotation about the axis of rotation of the shaft and said outer gerotor member comprises an externally toothed gerotor rotor member supported for rotational movement about its own axis and for orbiting movement about the axis of said one gerotor member.]

[17. A control unit as set forth in claim 14 wherein said one gerotor member comprises an externally toothed gerotor rotor member and said other gerotor member comprises an internally toothed gerotor rotor member.]

[18. A control unit as defined in claim 14 wherein said one gerotor member comprises an internally toothed gerotor rotor member which is mounted for rotary and orbital movement and said other of said gerotor members comprises an externally toothed gerotor rotor member supported for limited rotational movement for moving said movable valve part.]

[19. A control unit for directing fluid to a fluid motor comprising:

gerotor means for metering fluid flow therethrough and including an internally toothed gerotor member and an externally toothed gerotor member disposed within and in meshing engagement with said internally toothed gerotor member, said externally toothed gerotor member having fewer teeth than said internally toothed gerotor member for defining expanding and contracting chambers during rotation of a first of said gerotor members relative to the second gerotor member;

input means for rotating said first gerotor member relative to said second gerotor member;

commutator valve means operatively connected to said gerotor means for feeding fluid to and exhausting fluid from said expanding and contracting chambers;

directional control valve means for alternatively directing fluid exhausted from said commutator valve means to one of first and second outlets, said directional control valve means including a rotatable valve member having a neutral position and a first operating position for directing fluid flow to said commutator valve means while directing fluid exhausted therefrom to said first outlet during rotation of said first gerotor member in one direction and a second operating position for directing fluid flow to said commutator valve means while directing fluid exhausted therefrom to said second outlet during rotation of said first gerotor member in the opposite direction;

and means interconnecting said valve member and said second gerotor member for applying torque to said valve member upon initial rotation of said first gerotor member.]

[20. A control unit for directing fluid comprising:

gerotor means for metering fluid flow therethrough and including an internally toothed gerotor member and an externally toothed gerotor member disposed within and in meshing engagement with said internally toothed gerotor member, said externally toothed gerotor member having fewer teeth than said internally toothed gerotor member for defining expanding and contracting chambers during rotation of a first of said gerotor members relative to the second gerotor member;

input means for rotating said first gerotor member relative to said second gerotor member;

commutator valve means operatively connected to said gerotor means for feeding fluid to and exhausting fluid from said expanding and contracting chambers;

changeover valve means for alternatively directing fluid exhausted from said commutator valve means to one of first and second outlets, said changeover valve means including a rotatable valve member having a neutral position and a first operating position for feeding fluid flow to said commutator valve means while directing fluid exhausted therefrom to said first outlet during rotation of said first gerotor member in one direction and a second operating position for feeding fluid flow to said commutator valve means while directing fluid exhausted therefrom to said second outlet during rotation of said first gerotor member in the opposite direction;

and means interconnecting said valve member and said second gerotor member and including stop means for limiting rotation of said valve member to define said first and second operating positions while limiting rotation of said second gerotor member whereby rotation of said first gerotor member applies a torque to said second gerotor member to effect a rotation of said valve member.]

21. A control unit for controlling fluid flow to a fluid motor, said control unit comprising valve means for directing fluid to said fluid motor in response to rotation of the input shaft, said valve means including a fixed valve part and a movable valve part movable to direct fluid to said fluid motor, and means for transmitting torque from said input member to said movable valve part to effect movement thereof, said means for transmitting torque to said movable valve part comprising metering means for directing a metered flow of fluid upon rotation of said shaft to said valve parts, means for transmitting torque from said metering means to said movable valve part, said metering means comprising a gerotor mechanism having one [rotor] *gerotor* member drivingly connected with the input shaft and a second [rotor] *gerotor member drivingly connected with said movable valve part, said gerotor mechanism transmitting a torque to said valve part which is proportional to the torque applied to the input shaft and said valve means providing a fluid pressure flow to said fluid motor depending upon the amount of movement of said movable valve part, said one gerotor member comprising an internally toothed gerotor rotor member supported for rotation about the axis of rotation of the shaft and said* [other] *second* gerotor member comprising an externally toothed gerotor rotor member supported for rotational movement about its own axis and for orbiting movement about the axis of said one gerotor member, and including commutator valve means for providing fluid flow into and from the gerotor mechanism, said commutator valve means comprising a sleeve-like commutator valve member having exterior axial grooves and generally radially extending passages extending from the outer periphery thereof into the bore thereof, a manifold member having a bore within which said commutator valve member is located, said manifold member having passages extending therethrough and which alternately communicate with said axially extending grooves and said generally radially extending passages in said commutator valve member on relative rotation therebetween, and means drivingly connected said manifold member with said one [rotor] *gerotor* member for rotation therewith upon rotation of said input shaft.

[22. A control unit comprising a gerotor mechanism, said gerotor mechanism comprising an internally lobed gerotor rotor member drivingly connected with an input shaft, an externally lobed gerotor rotor member located within said internally lobed gerotor rotor member, the lobes on said gerotor rotor members defining pockets which expand and contract upon relative rotational and orbital movement of said gerotor members, commutator valve means for directing fluid flow to said expanding pockets and from said contracting pockets, said commutator valve means comprising a sleeve-like commutator valve member having exterior axial grooves and generally radially extending passages extending from the outer periphery thereof into the bore thereof, a manifold member having a bore within which said commutator valve member is located, said manifold member having passages extending therethrough and which alternately communicate with said axially extending grooves and said generally radially extending passages in said commutator valve member on relative rotation therebetween, means drivingly connecting said manifold member to said internally lobed gerotor member for rotation therewith, and including a fixed valve member and a controlling valve member movable through a predetermined limited angle relative to the fixed valve member to control fluid flow therethrough, and means connecting said externally lobed gerotor rotor member to said controlling valve member to transmit torque thereto to effect movement of said controlling valve member relative to said fixed valve member.]

*23. A control unit for controlling fluid flow to a fluid motor, said control unit comprising valve means for directing fluid to said fluid motor in response to rotation of a shaft about a central axis, said valve means including a fixed valve part and a movable valve part, said fixed and movable valve parts defining passages directing fluid to said fluid motor upon relative movement thereof, means for transmitting torque from said shaft to said movable valve part to effect movement thereof, said means for transmitting torque to said movable valve part comprising a metering mechanism for directing a metered flow of fluid through said valve parts to said motor upon rotation of said shaft, said metering mechanism comprising a gearset including relatively rotatable and orbital internally and externally toothed gear members, said internally toothed gear member having one more tooth than said externally toothed gear member and the teeth of said gear members defining axially extending fluid pockets which expand and contract on relative orbital and rotational movement of the gear members, commutator valve means for controlling flow to and from the fluid pockets formed by the gear members, one of said gear members being supported for limited rotational movement, a mechanical connection between said one gear member and said movable valve part for transmitting torque from said one gear member to said movable valve part upon limited rotational movement of said one gear member, means for transmitting torque from said shaft to said other of said gear members, a drive member disposed on one axial side of said gearset and sealingly closing one axial end of said fluid pockets, said commutator valve means including at least one commutator valve member disposed on the other axial side of said fluid pock-*

*ets, and fastener means for clampingly engaging said drive member, said commutator valve member and one of said gear members together so as to resist relative axial movement therebetween.*

*24. A control unit as defined in claim 23 wherein said externally toothed gear member is supported for orbital motion and for said limited rotational movement, and wherein said internally toothed gear member is supported for rotational movement and said mechanical connection comprises a link angularly disposed with respect to said central axis, a portion of said link being drivingly connected to said externally toothed gear member and rockable relative thereto and a portion of said link being drivingly connected with said movable valve part and rockable relative thereto to impart movement thereto in response to rotational movement of said externally toothed gear member, said fastener means clampingly engaging said drive member, said first commutator valve member and said internally toothed gear member together.*

*25. A control unit as defined in claim 23 wherein said second commutator valve member comprises a sleeve-like member having exterior axial grooves and generally radially extending passages extending from the outer periphery thereof into the bore thereof, said first commutator valve member comprising a manifold member having a bore within which said sleeve-like member is located, said manifold member having passages extending therethrough and which alternately communicate with said axially extending grooves and said generally radially extending passages in said sleeve-like member on relative rotation between said manifold member and said sleeve-like member.*

*26. A control unit as defined in claim 25 wherein said mechanical connection includes a link having a first portion drivingly connected with said sleeve-like member and rockable relative thereto, said link being angularly disposed with respect to said central axis and having a second portion drivingly connected with said part and rockable relative thereto, said mechanical connection further including a part drivingly connecting said sleeve-like member with said movable valve part.*

*27. A control unit as defined in claim 25 wherein said drive member includes a drive plate member supported solely for rotation about said central axis, said drive plate member being fixedly connected with said shaft for rotation therewith, said drive plate member including a radial face engaging a radial face of said internally toothed member to seal the fluid pockets at said one axial end of said gearset.*

*28. A control unit as defined in claim 27 including a plate member disposed between said manifold member and said other axial side of said gearset, said plate member having a radial face engaging another radial face of said internally toothed gear member, said fastener means clampingly connecting said plate member with said manifold member and with said internally toothed gear member.*

*29. A control unit as defined in claim 23 wherein said drive member, internally toothed gear member and said first commutator valve member are located in a first housing portion and are fastened together as a unit for simultaneous assembly within said first housing portion, and wherein said fixed and movable valve parts are located in a second housing portion.*

*30. A control unit as defined in claim 23 wherein said fixed and movable valve parts are disposed in a housing having first and second ports for fluid communication with said motor, said movable valve part being movable in opposite directions from a neutral position for communicating fluid between said commutator valve means and said first and second ports.*

*31. A control unit for controlling fluid flow to a fluid motor, said control unit comprising valve means for directing fluid to said fluid motor in response to rotation of an input shaft about a central axis, said valve means comprising a fixed valve part and a movable valve part, said fixed and movable valve parts defining passages for directing fluid to said fluid motor upon relative movement of said valve parts, a metering mechanism including an externally toothed gear member supported for limited rotational movement and an internally toothed gear member supported for orbital and rotational movement relative to said externally toothed gear member, said internally toothed gear member having one more tooth than said externally toothed gear member and the teeth of said gear members defining fluid pockets which expand and contract on relative orbital and rotational movement of the gear members, commutator valve means for controlling fluid flow to and from the fluid pockets formed by the gear members, said metering mechanism directing a metered flow of fluid to said motor through said valve parts upon rotation of said input shaft, a drive sleeve having a portion drivingly connected with said drive shaft for joint rotation therewith about said central axis, said drive sleeve having internal gear teeth, said internally toothed gear member having external gear teeth around the periphery thereof in meshing engagement with said internal gear teeth of said drive sleeve, a mechanical connection for transmitting torque from said externally toothed gear member to said movable valve part to move same relative to said fixed valve part in response to rotation of said externally toothed gear member, the intermeshing gear teeth of said drive sleeve and said internally toothed gear member and of said internally toothed gear member and said externally toothed gear member being effective to rotate and orbit said internally toothed gear member and to rotate said externally toothed gear member to transmit torque to said movable valve part upon rotation of said input shaft.*

*32. A control unit as defined in claim 31 wherein said drive sleeve comprises a tubular member having integrally formed internal gear teeth and said drive shaft has a fixed drive plate drivingly connected therewith and which has external gear teeth in meshing engagement with internal gear teeth on said tubular member.*

*33. A control unit as defined in claim 31 wherein said fixed and movable valve members comprise plate valve members movable relative to each other upon transmission of torque from said externally toothed gear member to one of the plate valve members.*

*34. A control unit as defined in claim 31 wherein said externally toothed gear member is mounted for limited rotation about an axis coaxial with said central axis and the inner diameter of said drive sleeve is greater than the outer diameter of said internally toothed gear member to enable said relative orbital movement to occur while the meshing engagement of said drive sleeve gear teeth and said gear teeth on the outer periphery of said internally toothed member is maintained.*

*35. A control unit as defined in claim 31 wherein the center of the internally toothed member is offset from the center of the drive sleeve, and wherein only a portion of the external gear teeth on the periphery thereof is in meshing engagement with the internal gear teeth of said drive teeth.*

*36. A control unit comprising an input shaft, housing means having an inlet port and a pair of outlet ports, a directional control valve means for porting fluid from said*

*inlet port selectively to one of said outlet ports, said directional control valve means comprising a fixed valve means and a controlling valve member movable through a predetermined limited distance relative to said fixed valve member to control fluid flow therethrough, and metering means in said housing interconnecting said input shaft and said controlling valve member for moving said controlling valve member said limited distance in response to initial rotation of said input shaft and for directing fluid flow to said directional control valve as said shaft rotates, said metering means comprising a gerotor mechanism having an internally toothed gerotor member and an externally toothed gerotor member, means connecting said input shaft to one of said gerotor members for rotation with said shaft, and means connecting the other of said gerotor members with said controlling valve member to move said controlling valve member, said other gerotor member being rotatable about its central axis in response to initial rotation of said one gerotor member to effect movement of said controlling valve member and said valve members constraining said other gerotor member to then orbit only relative to said one gerotor member during continued rotation of said one gerotor member by rotation of said input shaft when the force applied to said controlling valve member is not sufficient to move same.*

*37. A control unit comprising an input shaft, housing means having an inlet port and a pair of outlet ports, a directional control valve means for porting fluid from said inlet port selectively to one of said outlet ports, said directional control valve means comprising a fixed valve means and a controlling valve member movable through a predetermined limited distance relative to said fixed valve member to control fluid flow therethrough, and metering means in said housing interconnecting said input shaft and said controlling valve member for moving said controlling valve member said limited distance in response to initial rotation of said input shaft and for directing fluid flow to said directional control valve as said shaft rotates, said metering means comprising a gerotor mechanism having an internally toothed gerotor member and an externally toothed gerotor member, means connecting said input shaft to one of said gerotor members for rotation with said shaft, and means connecting the other of said gerotor members with said controlling valve member to move said controlling valve member, said one gerotor member comprising an internally toothed gerotor rotor member supported for rotation about the axis of rotation of the shaft and said other gerotor member comprising an externally toothed gerotor rotor member supported for rotational movement about its own axis and for orbiting movement about the axis of said one gerotor member.*

*38. A control unit comprising an input shaft, housing means having an inlet port and a pair of outlet ports, a directional control valve means for porting fluid from said inlet port selectively to one of said outlet ports, said directional control valve means comprising a fixed valve means and a controlling valve member movable through a predetermined limited distance relative to said fixed valve member to control fluid flow therethrough, and metering means in said housing interconnecting said input shaft and said controlling valve member for moving said controlling valve member said limited distance in response to initial rotation of said input shaft and for directing fluid flow to said directional control valve as said shaft rotates, said metering means comprising a gerotor mechanism having an internally toothed gerotor member and an externally toothed gerotor member, means connecting said input shaft to one of said gerotor members for rotation with said shaft, and means connecting the other of said gerotor members with said controlling valve member to move said controlling valve member, said one gerotor member comprising an externally toothed gerotor rotor member and said other gerotor member comprising an internally toothed gerotor member.*

*39. A control unit for controlling fluid flow to a fluid motor, said control unit comprising housing means having an inlet port and a pair of outlet ports for communicating with the fluid motor, directional control valve means for directing fluid from said inlet port selectively to one of said outlet ports in response to the direction of rotation of an input shaft, said directional control valve means including a fixed valve part and a movable valve part movable in opposite directions to direct fluid to a selected one of said outlet ports and to said fluid motor, and means for transmitting torque from said input shaft to said movable valve part to effect movement thereof, said means for transmitting torque to said movable valve part comprising metering means for directing a metered flow of fluid upon rotation of said shaft to said directional control valve means and means for transmitting torque from said metering means to said movable valve part, said metering means comprising a gerotor mechanism having one rotor member drivingly connected with the input shaft and a second rotor member drivingly connected with said movable valve part, said gerotor mechanism transmitting a torque to said valve part which is proportional to the torque applied to the input shaft and said valve means providing a fluid pressure flow to said fluid motor depending upon the amount of movement of said movable valve part, said one gerotor member comprising an internally toothed gerotor rotor member supported for rotation about the axis of rotation of the shaft and said second gerotor member comprising an externally toothed gerotor rotor member supported for rotational movement about its own axis and for orbiting movement about the axis of said one gerotor member.*

*40. A control unit for controlling fluid flow to a fluid motor, said control unit comprising housing means having an inlet port and a pair of outlet ports for communication with the fluid motor, directional control valve means for directing fluid from said inlet port selectively to one of said outlet ports in response to the direction of rotation of an input shaft, said directional control valve means including a fixed valve part and a movable valve part movable in opposite directions to direct fluid to a selected one of said outlet ports and to said fluid motor, and means for transmitting torque from said input shaft to said movable valve part to effect movement thereof, said means for transmitting torque to said movable valve part comprising metering means for directing a metered flow of fluid upon rotation of said shaft to said directional control valve means and means for transmitting torque from said metering means to said movable valve part, said metering means comprising a gerotor mechanism having one gerotor member drivingly connected with the input shaft and a second gerotor member drivingly connected with said movable valve part, said gerotor mechanism transmitting a torque to said valve part which is proportional to the torque applied to the input shaft and said valve means providing a fluid pressure flow to said fluid motor depending upon the amount of movement of said movable part, said one gerotor member comprising an externally toothed gerotor rotor member and said second gerotor member comprising an internally toothed gerotor rotor member.*

*41. A control unit for vehicle powersteering mechanism comprising:*

*a housing having an inlet for connection to a source of hydraulic fluid under pressure and an outlet for returning hydraulic fluid to said source;*

*a pair of ports for connection to a double chamber hydraulic servomotor the movement of which controls the steering of dirigible wheels of the vehicle;*

*a hydraulic motor provided with a rotatable element and a follower element;*

*a distributor valve means provided with at least one displaceable body, in the form of a sleeve, angularly displaceable with respect to a neutral position, said distributor valve means being operable on rotation of a control shaft connected thereto to divert hydraulic fluid flowing from said inlet through said housing to said outlet to one of said ports and thus to its associated chamber of said servomotor, via said hydraulic motor, the hydraulic fluid being exhausted from the other chamber of the servomotor to said outlet via said other port;*

*means adapted to form a direct connection of said rotatable element of the motor to said control shaft;*

*means adapted to form a mechanical connection of said follower element of the motor to the sleeve like displaceable body of said rotatable distributor valve means;*

*means adapted to limit the displacement of said sleeve like displaceable body with respect to the stationary part of said distributor valve means, and with respect to said neutral position;*

*a plurality of circumferentially spaced longitudinally extending passages provided in said sleeve like displaceable distributor body to feed hydraulic fluid from said inlet, via said motor, to one or the other of said ports when said sleeve like displaceable distributor body is in its displaced position with respect to the neutral position;*

*first passages in said housing communicating with said inlet and with said longitudinally extending passages; second passages in said housing emanating from each of said ports and communicating with said longitudinally extending passages; and*

*radially extending passages in said sleeve like displaceable distributor body communicating with said first passages in said housing, for feeding hydraulic fluid arriving from said inlet to said distributor valve means.*

*42. A fluid control unit comprising*

*an input shaft,*

*housing means having an inlet port and a pair of outlet ports,*

*a directional control valve means for porting fluid from said inlet port selectively to one of said outlet ports, said directional control valve means including*

*a valve member fixed relative to said housing means,*

*a controlling valve member movable through a predetermined limited distance relative to said fixed valve member to control fluid flow therethrough,*

*said fixed valve member and said controlling valve member comprising plate valve members movable relative to each other upon rotation of said input shaft,*

*a metering mechanism in said housing means connecting said input shaft and said controlling valve member for transmitting torque to move said controlling valve member said limited distance in response to rotation of said input shaft,*

*said metering mechanism comprising a gearset including relatively rotatable and orbital internally and externally toothed gears, said externally toothed gear being located within said internally toothed gear, said internally toothed gear having one more tooth than said externally toothed gear, and the teeth of said internally and externally toothed gears defining fluid chambers which expand and contract on relative orbital and rotational movement of the gears,*

*means connecting one of said gears to said input shaft for movement in response to rotation of the input shaft, means connecting the other of said gears to said controlling valve member,*

*a commutator plate-valve connected to said externally toothed gear and having a first radial face slidably engaging one radial face of said internally toothed gear, said commutator plate-valve member including passages communicating with said directional control valve means to direct fluid received by said directional control valve from the inlet to the expanding fluid pockets and to direct fluid from the contracting fluid pockets to the directional control valve, and*

*stop means for limiting movement of said controlling valve member of said directional control valve relative to the housing means.*

*43. A control unit as defined in claim 42 wherein said controlling valve member comprises a pivotal plate-valve member movable from a neutral position to an operating position communicating said inlet port with said commutator valve for directing fluid from said inlet port to said metering mechanism through said commutator valve and communicating one of said outlet ports with said commutator valve for directing fluid from said metering mechanism to said one of said outlet ports.*

*44. A control unit as defined in claim 43 wherein said fixed plate-valve member and said controlling plate-valve member have adjacent radially extending faces which are slidable relative to each other upon pivotal movement of said controlling plate-valve member in response to the torque transmitted thereto by rotation of said other of said gears, adjacent radial faces of said fixed and controlling plate-valve members cooperating upon relative pivoting movement to form part of fluid passages directing flow from said inlet port to said commutator valve and from said commutator valve to said one of said outlet ports.*

*45. A control unit as defined in claim 44 wherein said one gear element comprises said internally toothed gerotor gear and said other gear comprises said externally toothed gerotor gear, said commutator plate-valve member being movable with said externally toothed gerotor gear relative to said internally toothed gerotor gear and having a first radial face engaging one radial face of said internally toothed gerotor gear.*

*46. A hydraulic control unit comprising*

*means defining an inlet port and a pair of outlet ports,*

*an input shaft,*

*a metering mechanism operatively associated with said input shaft and allowing flow from the inlet port to an outlet port in a quantity which is proportional to the speed and extent of rotation of said input shaft, said metering mechanism including*

*a first gear element connected to said input shaft for rotation therewith and*

*a second gear element which orbits in response to rotation of said first gear element,*

*said first and second gear elements defining fluid chambers therebetween which have changing volumes during relative movement of said first and second gear elements,*

*control valve means including a pivotal valve having a neutral position and pivotal to an operating position upon rotation of said input shaft for directing fluid from said inlet port to some chambers in said metering mechanism and directing fluid from other chambers in said metering mechanism to one of said outlet ports,*

*means connecting said pivotal valve and said second gear element of the metering mechanism for common pivoting movement,*

*resilient means biasing said pivotal valve to said neutral position, and*

*stop means for limiting pivoting movement of said pivotal valve.*

*47. A hydraulic control unit as defined in claim 46 wherein said means connecting said pivotal valve and said second gear element of said metering mechanism comprises a link drivingly connected to and disposed at an angle to the axis of rotation of said second gear element, and said resilient means biasing said pivotal valve to said neutral position acts directly on said pivotal valve.*

*48. A control unit as defined in claim 47 wherein said first gear element of said metering mechanism comprises an internally toothed gerotor gear and said second gear element of said metering mechanism comprises a complementary externally toothed gerotor gear, said pivotal valve including a directional control valve portion and a commutator valve portion having joint pivotal movement, a manifold member coupled with said internally toothed gerotor gear and rotatable therewith relative to said commutator valve portion of said pivotal valve.*

*49. A control unit as defined in claim 48 wherein said pivotal valve comprises a cylindrical member having a plurality of circumferentially spaced, axially extending slots on the outer periphery thereof, and said control unit further includes a second valve member encircling said cylindrical member and having fluid passages therein, and said slots in said cylindrical member communicate with said fluid passages in said second valve member upon pivotal movement of said cylindrical member away from said neutral position.*

*50. A control unit as defined in claim 49 wherein said cylindrical member is hollow and certain of said axially extending slots includes openings communicating with the interior of said cylindrical member, and means defining a fluid passage communicating the interior of said cylindrical member with said metering mechanism through said commutator valve portion of said pivotal valve.*

*51. A control unit as defined in claim 50 including means defining an external housing, said resilient means for biasing said pivotal valve to the neutral position comprises a torsion spring located partially within said hollow cylindrical member, said torsion spring having a first portion releasably fixed against motion relative to said housing and an axially spaced portion connected with said pivotal valve for movement therewith and wherein said first portion of said torsion spring may be manually moved relative to said housing when said first portion of said torsion spring is released from said housing to allow pivotal movement of said pivotal valve to adjust the neutral position of said pivotal valve.*

*52. A control unit as defined in claim 46 wherein said control valve includes a commutator valve for directing fluid flow to and from the variable volume fluid chambers of said metering mechanism in timed relation to the changing volumes thereof during relative movement of said first and second gear elements, said pivotal valve comprising a first plate directional control valve member pivotal from a neutral position to an operating position communicating said inlet port with said commutator valve for directing fluid from said inlet port to said metering mechanism through said commutator valve and communicating said outlet port with said commutator valve for directing fluid from said metering mechanism to said outlet port.*

*53. A control unit as defined in claim 52 wherein said first plate directional control valve member cooperates with a second plate valve member adjacent thereto, said first plate valve member being pivotally movable with respect to said second plate valve member, said first plate valve member and said second plate valve member having adjacent radially extending faces which are slidable relative to each other upon pivotal movement of said first plate valve member in response to the torque transmitted thereto by rotation of said second gear element, adjacent radial faces of said first and second plate valve members cooperating upon relative rotation thereof to form part of fluid passages directing flow from said inlet port to said commutator valve and from said commutator valve to an outlet port.*

*54. A control unit as defined in claim 53 wherein said first gear element comprises an internally toothed gerotor gear and said second gear element comprises a complementary externally toothed gerotor gear, said commutator valve comprising a third plate valve member movable in timed relation to the movement of at least one of said gerotor gears and having a first radial face engaging one radial face of the internally toothed gerotor gear, said third plate valve member forming part of commutator passages for directing the flow of fluid to and from said fluid chambers of said metering mechanism.*

*55. A control unit as defined in claim 54 wherein said third plate valve member includes a second radial face engaging the other radial face of said first plate valve member and is connected to said externally toothed gear.*

*56. A control unit as defined in claim 46 further including a drive member connected with said input shaft and disposed on one axial side of said metering mechanism, said drive member sealingly closing one axial side of said metering mechanism, at least one commutator valve part disposed on the other axial side of the metering mechanism, and fastener means for clampingly engaging said drive member said second element of said metering mechanism and said one commutator valve part together to resist relative rotational and axial movement therebetween.*

*57. A control unit as defined in claim 46 wherein said stop means comprises a stop for limiting rotational movement of said pivotal valve, said stop being engageable with a part of said pivotal valve after limited pivotal movement thereof from said neutral position.*

*58. A hydraulic control unit comprising*

*means defining an inlet port and an outlet port,*

*an input shaft,*

*a metering mechanism operatively associated with said input shaft and controlling flow from the inlet port to the outlet port in a quantity which is proportional to the speed and extent of rotation of said input shaft,*

*said metering mechanism including a first gear element rotatable with said input shaft and a second gear element which can rotate and orbit about the central axis of said first element in response to rotation of said first element,*

*said first and second gear elements defining fluid chambers therebetween which have changing volumes during relative movement of said first and second elements,*

*control valve means including a pivotal control valve having a neutral position preventing flow from said inlet port through said metering mechanism to said*

*outlet port and pivotal to an operating position upon rotation of said input shaft whereat said control valve means directs flow from said inlet port to some chambers of said metering mechanism and flow from other chambers of said metering mechanism to said outlet port, means connecting said control valve and said second gear element including a pivotal link drivingly connected with and disposed at an angle to the axis of rotation of said second gear element and said control valve to effect pivoting movement of said control valve upon rotation of said second gear element,*

*biasing means acting directly on said control valve for biasing said control valve to said neutral position, and stop means for limiting the rotation of said control valve.*

* * * * *